United States Patent [19]

Rush

[11] Patent Number: 5,007,173
[45] Date of Patent: Apr. 16, 1991

[54] GASOLINE ENGINE POWERED HAND-HELD CIRCULAR SAW

[76] Inventor: Robert E. Rush, 560 Mellon Bridge Rd., Oxford, Ala. 36203

[21] Appl. No.: 537,800

[22] Filed: Jun. 14, 1990

[51] Int. Cl.[5] .................... B23D 45/16; B25F 11/00
[52] U.S. Cl. ................................................ 30/391
[58] Field of Search ............... 30/166.3, 388–391; 125/13.01, 13.02

[56] References Cited

U.S. PATENT DOCUMENTS 3,735,489  5/1973  Zatorsky ............................ 30/390
4,876,797 10/1989  Zapata ............................... 30/388

Primary Examiner—Douglas D. Watts
Attorney, Agent, or Firm—Michael I. Kroll

[57] ABSTRACT

A gasoline engine powered hand held cutting tool is disclosed, which includes a gasoline engine incorporated into the body, or frame, of the circular saw cutting tool. The engine is preferably a two-stroke engine, though, it should be emphasized, other gasoline powered engines of various shapes and sizes may be employed, as practical. The hand held circular saw cutting tool of the present invention further, preferably, includes a throttle trigger to control the engine speed, for increased efficiency, with the saw blade of the tool being connected to an engine crank shaft, preferably through a centrifugal clutch. The power tool of the present invention, in its preferred embodiment also preferably includes a plate for resting the tool of the invention on a piece of lumber intended for cutting.

5 Claims, 2 Drawing Sheets

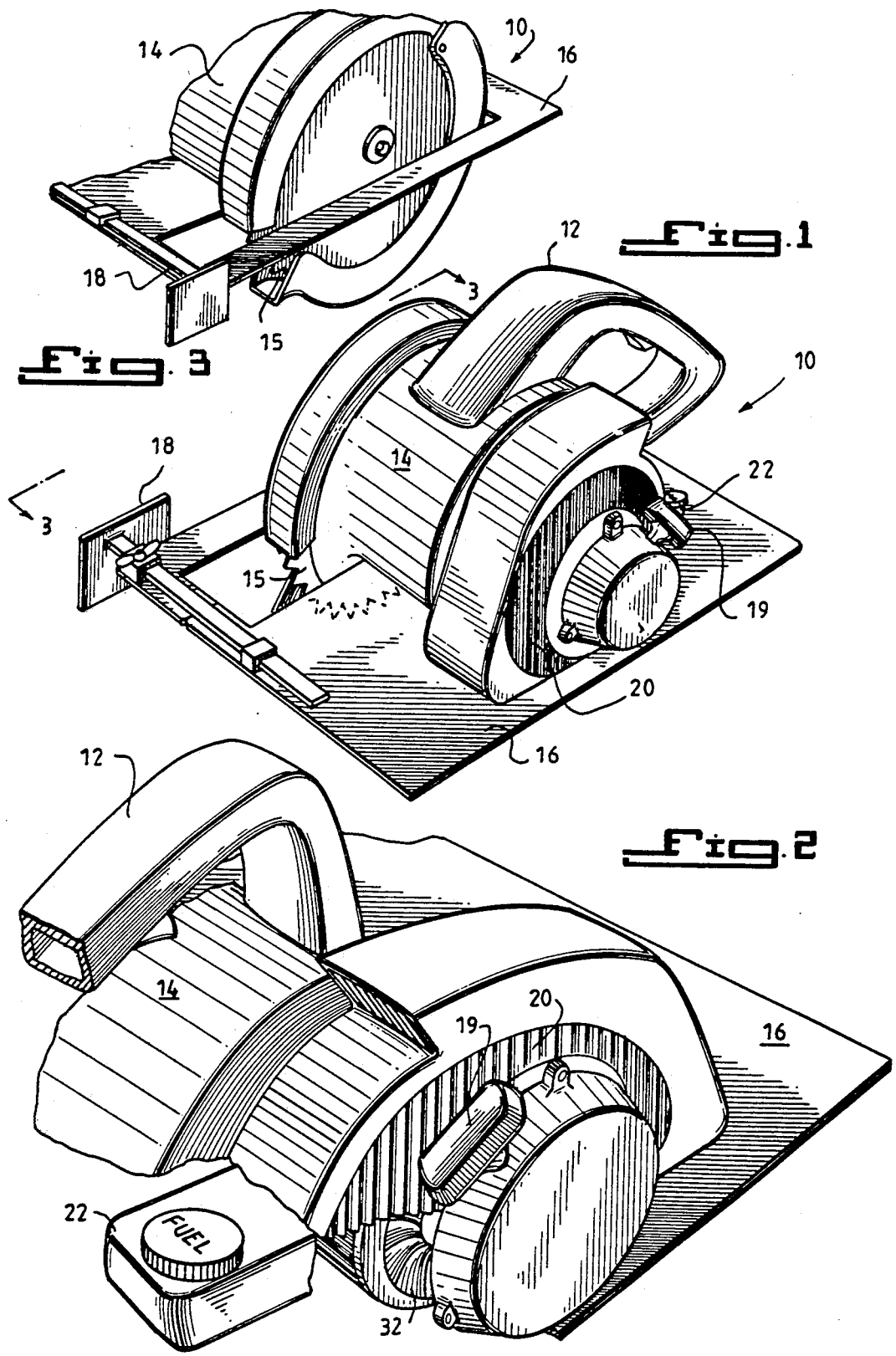

GASOLINE ENGINE POWERED HAND-HELD CIRCULAR SAW

BACKGROUND OF THE INVENTION

1. Field of the Invention

The present invention relates, generally, to a gasoline engine powered, hand-held circular saw. More particularly, the present invention relates to a gasoline powered circular saw which provides a means for making a precise, smooth cut in lumber without the need of an electrical power source and without need of a separate gasoline generating facility.

2. Description of the Prior Art

Prior to the present invention, the art has generally consisted of rotary blade cutting tools which either relied upon external electrical power sources or separate, or external, gasoline generating facilities.

Prior art known to the inventor, which generally concerns the relevant technical art of the present invention includes: Breer et. al., U.S. Pat. No. 3,135,304, issued Jun. 2, 1964; Ehlen, U.S. Pat. No. 3,468,351, issued Sept. 23, 1969; Townsend et. al., U.S. Pat. No. 3,513,888, issued May 26, 1970; Nagashima et al., U.S. Pat. No. 4,809,438, Mar. 7, 1989; and, Clark et. al., U.S. Pat. No. 4,848,001, issued Jul. 18, 1989.

Conventional rotary cutting saws known to the art all lack the convenience and efficiency attainable by the present invention. For example, as alluded to above, gasoline powered saws require a separate generating unit for powering. The user of such a tool must either transport such a separate generating unit with him from place to place, in order to obtain full use of such a gasoline powered rotary cutting tool, or alternatively, be certain that the intended working place has access to such a generating facility.

With respect to electrically powered rotary cutting tools presently known to the art, such tools have generally required either a separate power source, such as an electrical outlet, or have otherwise been battery powered.

In the former case of a separate electrical power source, as with the gasoline generated rotary cutting tool, the user of such a tool must be certain of an available power source. This may be of particular difficulty if the user intends use of such an electrical power tool in an outside location, particularly if such location might be geographically remote, e.g., work related to the forestry industry.

In the latter instance, wherein the user of the electrical power tool is able to rely upon battery power, such a user must be certain that the battery of the tool is sufficient charged. In addition, if the tool is to be used at a point in time which is substantially later than the time when the electrical power tool was charged, the previously charged battery would necessarily begin to lose its charge and, therefore, not be as powerful, when in use, for as long a period of time as such tool might otherwise be.

In addition, it is generally well known that battery powered tools are particularly sensitive to weather conditions. For example, moisture and, particularly, cold weather can seriously diminish the life span of a particular charge therefore raising doubt as to whether a particular job, once begun in earnest, can be properly completed. Moreover, even a battery which may be charged and recharged many times will, over time, steady lose its efficiency and will eventually no longer be able to be recharged in an efficient, economical manner.

The prior art, to date, has not included the benefits of a gasoline engine powered rotary cutting tool over an electrical tool, without the need of a separate generating facility.

The present invention, as will be discussed in greater detail hereinafter, is concerned with providing users of such tools with the benefits attainable via a gasoline power tool, without the attendant drawbacks which gasoline powered tools presently include resulting from the requirement of a separate generating facility.

SUMMARY OF THE INVENTION

It is, therefore, an object of the present invention to provide a gasoline engine powered hand-held circular saw tool which does not require a separate, external generating unit.

It is a further object of the present invention to provide a gasoline engine powered hand-held circular saw tool which need not rely upon, and which avoids the disadvantages of, electrically-operated or battery-powered rotary cutting tools.

It is, yet, a further object of the present invention to provide a gasoline engine powered hand-held circular saw tool which is capable of use in remote locations where conventional power sources are not readily available.

It is, still, a further object of the present invention to provide a gasoline engine powered hand-held circular saw tool which may be operated in climates wherein battery powered tools would not efficiently operate.

It is an additional object of the present invention to provide a gasoline engine powered hand-held circular saw tool which will overcome the disadvantages inherent in prior art devices.

The foregoing and related objects are accomplished by a gasoline engine powered hand held cutting tool, which includes a gasoline engine incorporated into the body, or frame, of the circular saw cutting tool. The engine is preferably a two-stroke engine, though, it should be emphasized, other gasoline powered engines of various shapes and sizes may be employed, as practical.

The hand held circular saw cutting tool of the present invention further, preferably, includes a throttle trigger to control the engine speed, for increased efficiency, with the saw blade of the tool being connected to an engine crank shaft, preferably through a centrifugal clutch.

The power tool of the present invention, in its peferred embodiment also preferably includes a plate for resting the tool of the invention on a piece of lumber intended for cutting. The plate preferably includes means for assuring a smooth, even cut, such as a rip fence.

To the accomplishment of the above and related objects, the present invention may be embodied in the form illustrated in the accompanying drawing figures, attention being called to the fact, however, that the drawing figures are intended to be illustrative only, and that changes may be made in the specific construction illustrated and described within the scope of the appended claims.

BRIEF DESCRIPTION OF THE DRAWING FIGURES

In the drawing, wherein similar reference numerals denote similar features throughout the several views:

FIG. 1 is a front, perspective view of the gasoline powered, hand held circular saw in accordance with the present invention;

FIG. 2 is an enlarged, front perspective view of the gasoline powered, hand held circular saw, as shown in FIG. 1, with a portion of the outer casing of the apparatus of the invention being broken away so as to show a partial view of its internal structure;

FIG. 3 is a partial rear perspective view of the gasoline powered, hand held circular saw in accordance with the present invention, taken along the 3—3 line of FIG. 1;

DETAILED DESCRIPTION OF THE PREFERRED EMBODIMENTS

Figure 4:
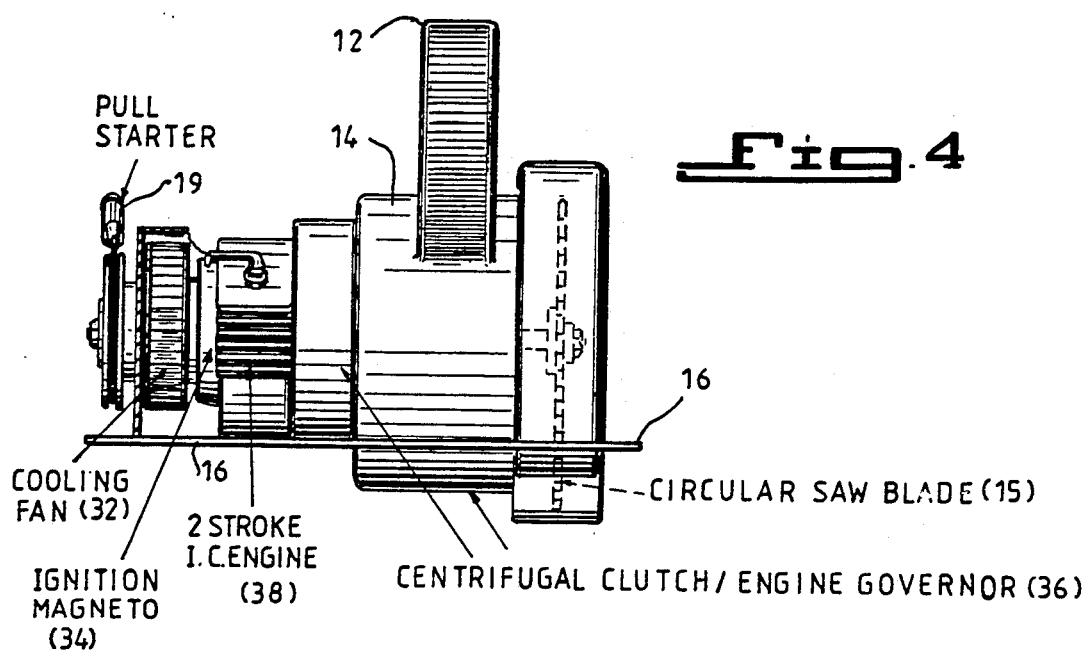
FIG. 4 is a front, elevational view of the gasoline powered, hand held circular saw in accordance with the present invention; and, FIG. 5 is a side, cross-sectional view, taken in elevation, of the gasoline powered, hand held circular saw in accordance with the present invention.

Turning now, in detail, to an analysis of the accompanying drawing figures, FIG. 1 presents a front, perspective view of the gasoline powered, hand held circular saw 10 in accordance with the present invention. Circular saw 10 is preferably provided with handle 12 and outer casing 14. The saw blade of the invention is designated by reference numeral 15.

Circular saw 10 also preferably includes a flat resting plate 16 for resting saw 10 upon a piece of lumber intended for cutting. Plate 16, in turn, preferably includes an adjustable rip fence 18.

As per conventional in such circular saws, the engine of saw 10 may be provided with, for example, a pull starter 19, or other starter, such as via a key ignition (not shown), etc. Reference numeral 20 designates the airlet for the engine of saw 10. (See, FIGS. 1 and 2.)

Figure 5:
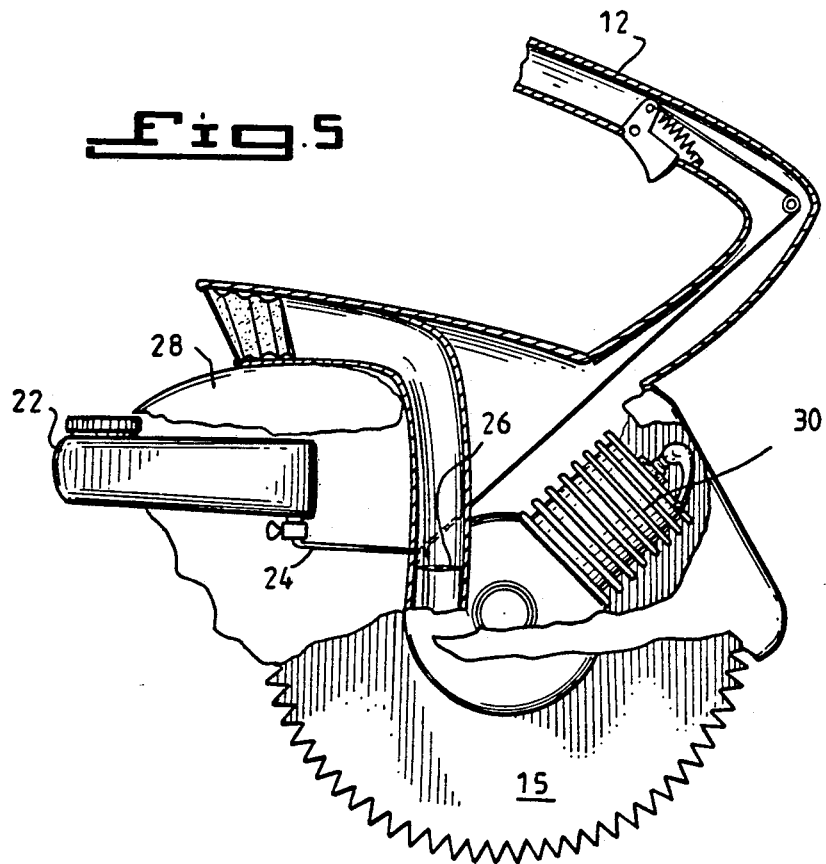

Referring to FIG. 2, shown is an enlarged, front perspective view of the gasoline powered, hand held circular saw 10, as shown in FIG. 1, with a portion of the outer casing 14 of the apparatus of the invention being broken away so as to show a partial view of the present invention's internal structure. FIG. 2 shows fuel tank 22 as being contained with the body or casing 14 of circular saw 10 of the present invention. FIG. 5 shows a gas line 24 leading from fuel tank 22. A butterfly valve 26 is further provided for controlling fuel from fuel tank 22 to the engine of the saw 10. Reference numeral 28 is the air valve for the engine; reference numeral 30 represents the cylinder head of the engine.

FIG. 4 is a front, elevational view of the gasoline powered, hand held circular saw 10 in accordance with the present invention. FIG. 4 shows additional features of the engine of the present invention, including a cooling fan 32; an ignition magneto 34; and a centrifugal clutch 36. The saw blade 15 of the present invention is connected to an engine crank shaft through the centrifugal clutch 36. Such features operate in conventional matter generally known to persons of ordinary skill in the art.

As illustrated in FIG. 4, the preferred type of engine for the circular saw 10 of the present invention is a 2-stroke internal combustion engine 38. Engine 38 is preferably of a size so that it can essentially be contained within casing 14. A throttle trigger is further provided to control engine speed.

It should, of course, be recognized that other types of gasoline powered engines may be employed in connection with the present invention, the foregoing type of engine, however, is the preferred engine in view of the heretofore stated objects of the invention and the drawbacks inherent in the prior art.

LIST OF REFERENCE NUMERALS 10 gasoline powered, hand held circular saw
12 handle
14 casing
15 saw blade
16 plate
18 rip fence
19 pull starter
20 airlet
22 fuel tank
24 gas line
26 butterfly valve
28 air valve
30 cylinder head
32 cooling fan
34 ignition magneto
36 centrifugal clutch
38 2-stroke internal combustion engine It will be understood that each of the elements described above, or two or more together, may also find a useful application in other types of methods differing from the type described above.

While certain novel features of the present invention have been shown and described and are pointed out in the annexed claims, the present invention is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will be fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A gasoline engine powered hand-held circular saw, comprising:
   (a) a casing having a front, a top, and a bottom;
   (b) a fuel tank disposed substantially on said front of said casing;
   (c) a circular saw blade disposed substantially within said casing;
   (d) an internal combustion engine disposed substantially along side said circular saw blade within said casing, said internal combustion engine having a crankshaft with an end, said circular saw blade being connected to said end of said crankshaft of said internal combustion engine; and
   (e) a handle disposed substantially on said top of said casing so that the saw can be easily handled and used.

2. The gasoline engine powered hand-held circular saw according to claim 1, wherein said internal combustion engine is a two-stroke engine.

3. The gasoline engine powered hand-held circular saw according to claim 1, wherein said internal combustion engine is a two-stroke engine.

4. The gasoline engine powered hand-held circular saw according to claim 3; further comprising a plate for setting the hand-held circular saw upon a workpiece, said plate being disposed on said bottom of said casing, said plate having an opening through which said circular saw blade is disposed.

5. The gasoline engine powered hand-held circular saw according to claim 4, wherein said plate includes a rip fence.

* * * * *